(12) United States Patent
Tseng et al.

(10) Patent No.: US 10,439,682 B2
(45) Date of Patent: Oct. 8, 2019

(54) ACCESS MECHANISM FOR PROXIMITY-BASED SERVICE UE-TO-NETWORK RELAY SERVICE

(71) Applicant: FG Innovation Company Limited, Tuen Mun (CN)

(72) Inventors: Yung-Lan Tseng, Taipei (TW); Chie-Ming Chou, Zhubei (TW)

(73) Assignee: FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 15/680,517

(22) Filed: Aug. 18, 2017

(65) Prior Publication Data
US 2018/0054237 A1    Feb. 22, 2018

Related U.S. Application Data

(60) Provisional application No. 62/377,144, filed on Aug. 19, 2016.

(51) Int. Cl.
*H04W 36/00* (2009.01)
*H04B 7/026* (2017.01)
(Continued)

(52) U.S. Cl.
CPC ........ *H04B 7/026* (2013.01); *H04W 36/0022* (2013.01); *H04W 36/0033* (2013.01);
(Continued)

(58) Field of Classification Search
CPC .............. H04B 7/026; H04W 36/0022; H04W 36/0033; H04W 72/08; H04W 72/085;
(Continued)

(56) References Cited

U.S. PATENT DOCUMENTS

| 2016/0073327 A1* | 3/2016 | Clougherty ......... H04L 12/4633 370/254 |
| 2017/0013573 A1* | 1/2017 | Jung ..................... H04W 56/00 |

(Continued)

OTHER PUBLICATIONS

3rd Generation Partnership Project; Technical Specification Group Services and System Aspects; Proximity-based services (ProSe); Stage 2; (Release 13); 3GPP TS 23.303 V13.4.0 (Jun. 2016).
(Continued)

*Primary Examiner* — Kibrom T Hailu
(74) *Attorney, Agent, or Firm* — ScienBiziP, P.C.

(57) ABSTRACT

A method for a relay user equipment (UE) to forward packets between a base station and a remote UE is disclosed. The method includes assigning network functions by the base station to at least one of the remote UE and the relay UE for a relay network slice, and selecting one or more sidelink radio resources and a corresponding RAN profile for forwarding the packets between the remote UE and the relay UE, where the selecting the one or more sidelink radio resources includes sending a sidelink-measurement configuration from the base station to at least one of the remote UE and the relay UE. The sidelink-measurement configuration includes a list of sidelink-candidate component carriers having licensed band and/or unlicensed band component carriers.

21 Claims, 8 Drawing Sheets

(51) Int. Cl.
  *H04W 72/08* (2009.01)
  *H04W 88/10* (2009.01)
  *H04W 8/00* (2009.01)
  *H04W 72/04* (2009.01)
  *H04W 88/04* (2009.01)

(52) U.S. Cl.
  CPC ......... *H04W 72/08* (2013.01); *H04W 72/085* (2013.01); *H04W 8/005* (2013.01); *H04W 72/0406* (2013.01); *H04W 88/04* (2013.01); *H04W 88/10* (2013.01)

(58) Field of Classification Search
  CPC . H04W 8/005; H04W 72/0406; H04W 88/04; H04W 88/10; H04W 72/1273; H04W 72/042
  See application file for complete search history.

(56) References Cited

U.S. PATENT DOCUMENTS

2017/0331670 A1* 11/2017 Parkvall ............... H04J 11/0079
2018/0035278 A1* 2/2018 Aminaka ............... H04W 8/00
2018/0110057 A1* 4/2018 Park ....................... H04W 72/12
2018/0192459 A1* 7/2018 Xu ......................... H04W 76/23
2018/0206176 A1* 7/2018 Panteleev ............. H04W 76/14
2018/0249516 A1* 8/2018 Jung ..................... H04W 88/04

OTHER PUBLICATIONS

3rd Generation Partnership Project; Technical Specification Group Radio Access Network; Evolved Universal Terrestrial Radio Access (E-UTRA); Physical layer procedures; (Release 13); 3GPP TS 36.213 V13.2.0 (Jun. 2016).

3rd Generation Partnership Project; Technical Specification Group Radio Access Network; Evolved Universal Terrestrial Radio Access (E-UTRA); Medium Access Control (MAC) protocol specification; (Release 13); 3GPP TS 36.321 V13.2.0 (Jun. 2016).

3rd Generation Partnership Project; Technical Specification Group Radio Access Network; Evolved Universal Terrestrial Radio Access (E-UTRA); Radio Resource Control (RRC); Protocol specification; (Release 13); 3GPP TS 36.331 V13.2.0 (Jun. 2016).

* cited by examiner

ACCESS MECHANISM FOR PROXIMITY-BASED SERVICE UE-TO-NETWORK RELAY SERVICE

CROSS-REFERENCE TO RELATED APPLICATION(S)

The present application is related to provisional U.S. Patent Application Ser. No. 62/377,144 filed Aug. 19, 2016, entitled "Access Mechanism for ProSe UE-to-Network Relay Service." The disclosure of the application is hereby incorporated fully by reference into the present application.

FIELD

The present application generally relates to wireless communications, and pertains particularly to proximity-based service (ProSe) relay service.

BACKGROUND

New Radio (NR) has been discussed in the 3rd Generation Partnership Project (3GPP) as a key technology for supporting the operation of the next generation wireless network. NR technology is expected to provide flexible radio protocol structure and architecture to accommodate a wide variety of service scenario requirements, such as high throughput, high reliability, low latency, and lower energy consumption. Network slice and radio access network (RAN) profile are envisioned as two of the key enabling technologies for NR. Also, ProSe UE-to-Network relay service has been under discussion in the 3GPP radio access network (RAN) Working Groups (WGs). However, the mechanisms for a core network (CN), a base station, and/or a relay user equipment (UE) to activate a ProSe UE-to-Network Relay service (hereinafter referred to as "Relay service"), and the relationships and procedures between network slice and RAN profile upon Relay services had remained unclear. Moreover, for efficient radio resource management, RAN needs to provide further control to help a relay UE and/or a remote UE operate on appropriate component carriers) (CCs).

Thus, there is a need in the art for relay network slice and RAN profile provisioning procedures and radio access mechanisms for relay services.

BRIEF DESCRIPTION OF THE DRAWINGS

Aspects of the exemplary disclosure are best understood from the following detailed description when read with the accompanying Figures. Various features are not drawn to scale, dimensions of various features may be arbitrarily increased or reduced for clarity of discussion.

DETAILED DESCRIPTION

Figure 1:
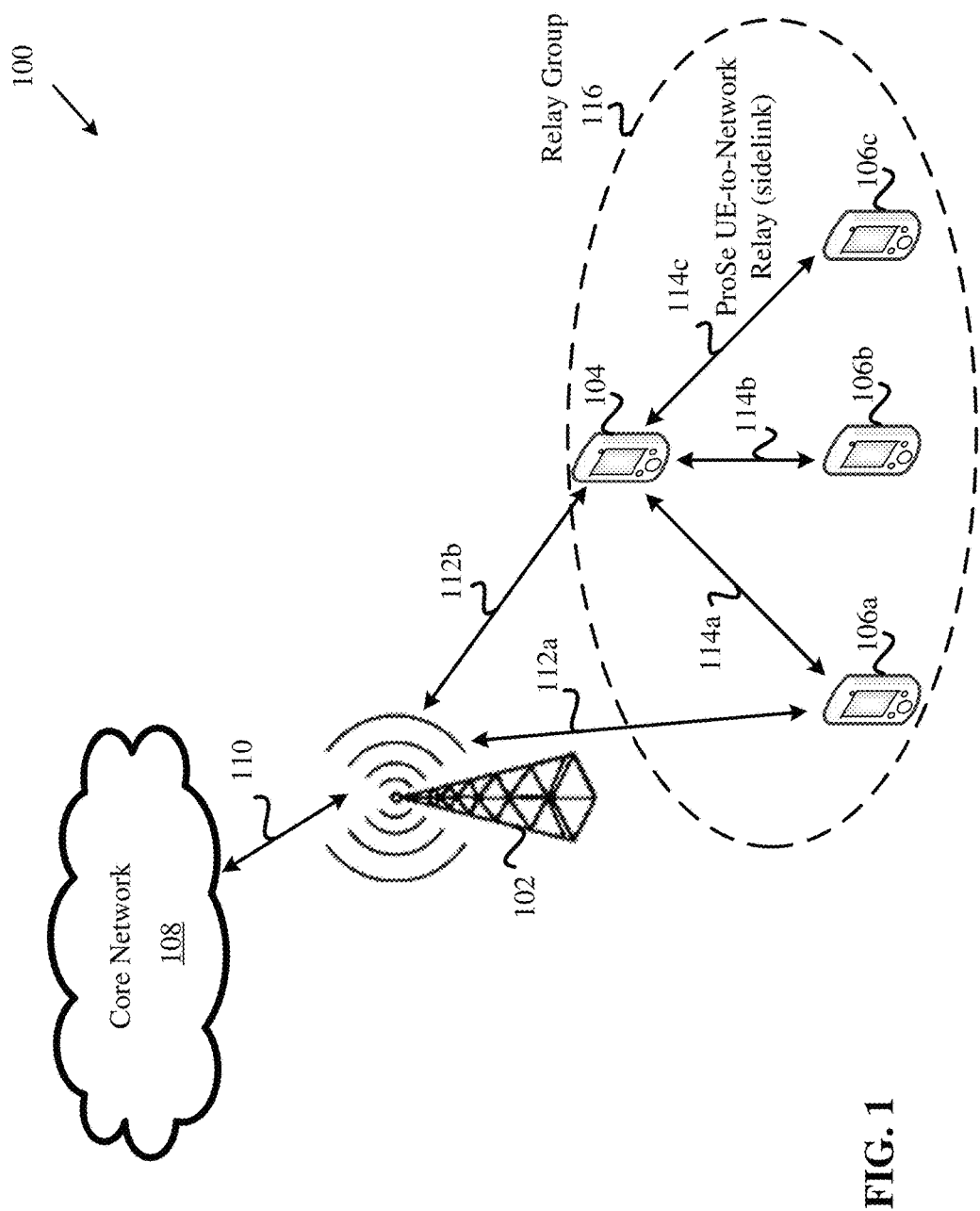
FIG. 1 is a diagram illustrating an exemplary network environment in which implementations of ProSe UE-to-Network relay service may be employed in accordance with an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or alorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions, A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access (E-UTRA) network, a Next-Generation Core (NGC), or an internee), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, three candidate coding schemes are considered for NR: (1) low-density parity-check (LDPC), (2) Polar Code, and (3) Turbo Code. The coding scheme adaption may be configured based on the channel conditions and/or the service applications.

Moreover, it is also considered that in a transmission time interval $T_X$ of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Referring to FIG. 1, FIG. 1 is a diagram illustrating an exemplary network environment in which implementations of ProSe UE-to-Network relay service may be employed, in accordance with an exemplary implementation of the present application. Such a network environment is illustrated and designated generally as network environment 100. Network environment 100 is one example of a suitable network environment and is not intended to suggest any limitation as to the scope of use or functionality of the invention. Neither should the network environment be interpreted as having any dependency or requirement relating to any one or combination of components illustrated. As shown in Figure network environment 100 includes base station 102., relay UE 104, remote UEs 106a, 106b, and 106c (collectively referred to remote UEs 106), and core network (CN) 108.

In network environment 100, base station 102, which may also be referred to as a cell site, is configured to communicate with UEs, such as relay UE 104 and remote UEs 106. Relay UE 104 is located within the geographical area, or cell, covered by radio antennas of base station 102. Each of remote UEs 106a, 106b, and 106c may/may not be located within the geographical area, or cell, covered by radio antennas of base station 102. Base station 102 (e.g., eNB in LTE/LTE-A, eNB in NR, or gNB in NR) may operatively allocate and schedule downlink and uplink resources to UEs within its cell coverage, and allocate sidelink (SL) resources for supporting ProSe services.

In network environment 100, relay UE 104 and remote UEs 106, may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation a router, an access point and any combination of these delineated devices, In some respects, at least one of relay UE 104 and remote UEs 106 may include, for example, a display(s), a power source(s) (e.g., a battery), a data store(s), a speaker(s), memory, a buffer(s), a radio(s) and the like. In some implementations, at least one of relay UE 104 and remote UEs 106 may include a wireless or mobile device with which a wireless telecommunication network(s) can be utilized for communication (e.g., voice and/or data communication). In this regard, relay UE 104 and remote UEs 106 can be any mobile computing device that communicates by way of a wireless network, for example, a 3G, 4G, or 5G NR network.

As shown in FIG. 1, relay UE 104 is a UE configured to forward data from base station 102 to one or more remote UEs 106, and vice versa. Relay group 116 includes relay UE 104 and remote UEs 106a, 106b, and 106c. Relay group 116 (e.g., pairing of relay UE 104 to remote UEs 106) is formed before packet forwarding. Each of relay UE 104 and remote UEs 106 may have a unique ProSe UE ID providing an identification of the relay/remote UE in a link layer. In addition, relay group 116 may have a unique ProSe group ID providing an identification of the relay group in the link layer.

It should be noted that, in contrast to a conventional network environment in which ProSe UE IDs and ProSe group IDs are assigned by a network, according to implementations of the present application, ProSe UE IDs and ProSe group IDs may be assigned by their corresponding base station or by the core network.

In relay group 116, relay UE 104 is in the coverage of base station 102. Relay UE 104 has an active RRC (radio resource control) connection with base station 102. In addition, each of remote UEs 106 also has an RRC Connection with base station 102 through the relaying of relay UE 104. Each of remote UEs 106 may be either in-coverage or out-of-coverage of base station 102. When a remote UE (e.g., any of remote UEs 106) is an in-coverage remote UE UE 106a), CN 108 may deliver control commands to the UE 106a through air interface 112a (e.g., Uu interface/NB-IoT (Narrow Band-Internet of Things)/eMTC (enhanced Machine Type Communication)) directly. When a remote UE (e.g., any of remote UEs 106) is an out-of-coverage remote UE, CN 108 may deliver control commands to relay UE 104 through air interface 112b (e.g., Uu interface/NB-IoT/eMTC), and relay UE 104 relays the control commands to the remote UE through an air interface. In network environment 100, such as a LTE network or a 5G NR network, the air interface between relay UE 104 and each of remote UEs 106a, 106b, and 106c is sidelink (SL) 114a, SL 114b, and SL114c, respectively.

CN 108 can be part of a telecommunication network that conned subscribers to their immediate service provider. In some instances, CN 108 can be associated with a telecommunications provider that provides services (e.g., LTE) to UE, such as relay UE 104 and remote UEs 106. For example, CN 108 may provide voice services to UE or corresponding users that are registered or subscribed to utilize the services provided by a telecommunications provider. CN 108 can comprise any communication network providing, voice and/or data service(s), such as, for example, a 1x circuit voice, a 3G network (e.g., CDMA, CDMA2000, WCDMA, GSM, UMTS), a 4G network (WiMAX, LTE, LTE-A, HSDPA), or a 5G NR network, CN 108 may exchange information with base station 102 over interface 110 (e.g., S1 interface in LTE network).

In one implementation, in a LTE system, a sidelink may rely on a licensed band having one or more radio frequency carriers dedicated for a base station and authorized UEs. In another implementation, in an NR system, a relay service may rely on a licensed band or an unlicensed band. It should be understood that, each country may have its own accessing regulations, such as listen-before-talk (LBT) protocol or maximum channel occupancy time, for a UE to access unlicensed bands. Accordingly, when an unlicensed band is to be utilized, the UEs (relay/remote UEs) need to obey the accessing rules.

It should be noted that, although implementations of the present application described herein involve one-to-one relay services, between a relay UE and a remote UE, such description is not intended to suggest any limitation as to the scope of use or functionality of the invention.

Figure 2:
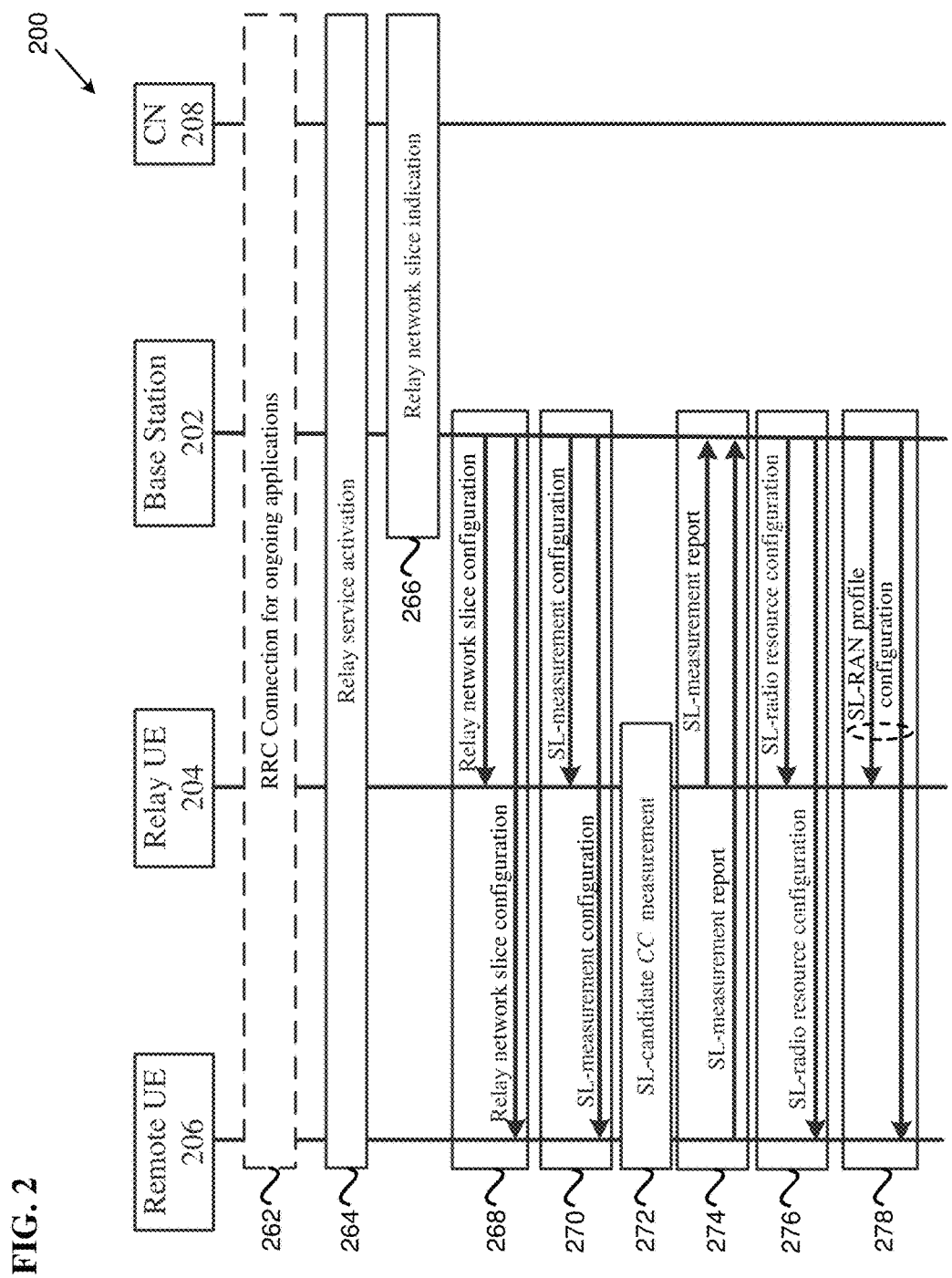
FIG. 2 is a diagram illustrating a method for relaying network slice provisioning and sidelink radio access mechanism, in accordance with an exemplary implementation of the present application.

FIG. 2 is a diagram illustrating a method for relaying network slice provisioning and sidelink radio access mechanism, in accordance with an exemplary implementation of the present application. In diagram 200, a wireless communication network includes base station 202, relay UE 204, remote UE 206, and CN 208. In the present implementation, base station 202, relay UE 204, remote UE 206, and CN 208 may substantially correspond to base station 102, relay UE 104, any one of remote UEs 106, and CN 108, respectively, as shown and described with reference to FIG. 1. Also, in the present implementation, relay UE 204 is an in-coverage relay UE, and remote UE 206 is an in-coverage remote UE. That is, both relay UE 204 and remote UE 206 are within the coverage of base station 202.

In block 262, diagram 200 includes RRC Connection for ongoing applications. Relay UE 204, remote UE 206, and base station 202 may exchange information with each other over an air interface of a LTE and/or NR system. Relay UE 204 and remote UE 206 may exchange information using a sidelink. Base station 202 and CN 208 may exchange information over an air interface of a LTE and/or NR system (e.g., S1 interface in LTE network) or through a wired backhaul connection.

In block 264, diagram 200 includes relay service activation. In one implementation, a relay service may be activated by base station 202. In another implementation, a relay service may be activated by relay UE 204. In yet another implementation, a relay service may be activated by remote UE 206. In yet another implementation, a relay service may be activated by CN 208. In some implementations, when a relay service is activated, relay UE 204 and remote UE 206 may provide their sidelink capabilities to base station 202, for example, through dedicated signaling (e.g., sidelinkUE-information). The sidelink capability information may include: (1) frequency band(s) in which a UE can operate; (2) role of the UE (e.g., relay UE or remote UE); (3) ID of the requested relay network slice. Based on a request of the ID of relay network slice coming from the UE, the CN may find the target network function on the CN/RAN/relay UE/remote UE of the "relay network slice" and help the remote UE/relay UE connect with the CN part of the relay network slice.

In block 266, diagram 200 includes relay network slice indication. During the relay network slice indication in block 266, CN 208 and/or base station 202 may generate a relay network slice instance. The relay network slice instance is provided to support the relay service. In one implementation, a relay network slice instance may be decided based on the ID of the requested relay network slice from the relay UE/remote UE. In another implementation, a relay network slice instance may be decided by the CN. The relay network slice instance comprises network functions of CN 208, RAN (including base station 202), relay UE 204, and remote UE 206.

In block 268, diagram 200 includes providing relay network slice information from base station 202 to relay UE 204 and remote UE 206. In block 268, base station 202 delivers the corresponding Relay network slice configuration messages to relay UE 204 and remote UE 206. Then, relay UE 204 and remote UE 206 may configure relay network slice instance upon receiving their corresponding Relay network slice configuration messages from base station 202. Each of the Relay network slice configuration messages may include information, such as relay service type, network function configuration for relay service, and end-to-end QoS control configuration. In some implementations, there may be more than one relay network slice instance where the remote UE 206 requires different types of relay services. Under such condition, each relay network slice instance may also be further indexed in the Relay network slice configuration message (e.g., relay slice#1, relay slice#2, and etc.).

For relay service type, the Relaying network slice configuration messages may indicate which type of relay network slice (e.g., Layer-3 relaying or Layer-2 relaying) is provided for relay UE 204 and remote UE 206. Layer-3 relaying refers to a type of relay service in which the activation and control of the relay service is decided and configured in the CN level (e.g., a ProSe Function in CN 208). Layer-2 relaying refers to a type of relay service in which the activation and control of the relay service is decided and configured in the RAN level (e.g., by base station 202) after the relay network slice indication. That is, in Layer-2 relaying, the base station (e.g., base station 202) activates and controls the relay service. For example, base station 202 may assign network functions to relay UE 204 and/or remote UE 206. In the present implementation, relay UE 204 and remote UE 206 may have different relay service types among different relay network slice instances. The network slice and the corresponding network functions may be based on the relay service type. In one implementation, the relay service type(s) may be determined by CN 208. In another implementation, the relay service type(s) may be determined by base station 202.

The Relaying network slice configuration messages may also indicate a network function configuration for the relay network slice instance for relay UE 204 and remote UE 206. The network function configuration includes the network functions which relay UE 204 and remote UE 206 each need to select for the relay service.

Figure 3:
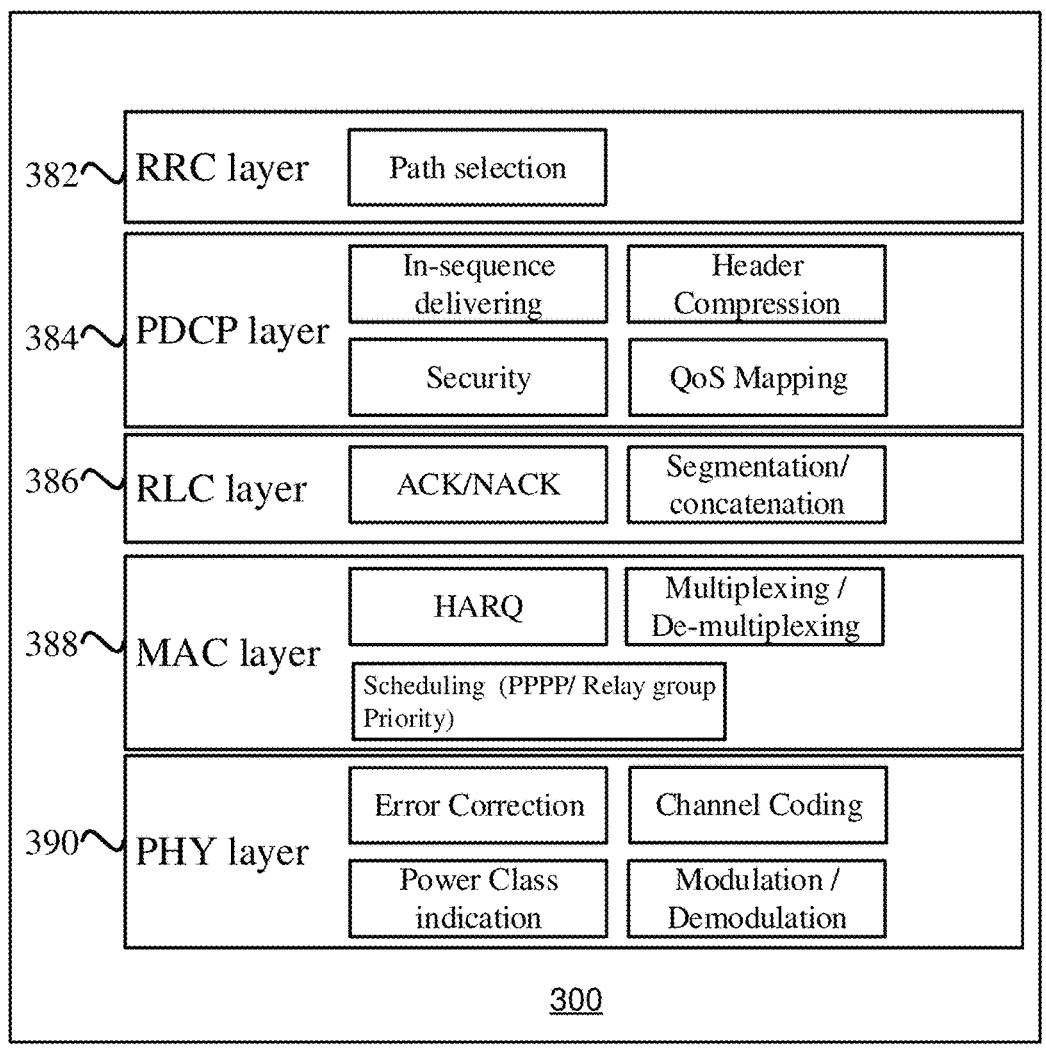
FIG. 3 is a schematic diagram of a protocol stack of a UE having various network functions for a relay service slice, according to an exemplary implementation of the present application.

FIG. 3 is a schematic diagram of a protocol stack of a UE having various network functions for a relay network slice instance, according to an exemplary implementation of the present application. As shown in FIG. 3, protocol stack 300 includes radio resource control (RRC) layer 382, packet data control protocol (PDCP) layer 384, radio link control (RLC) layer 386, medium access control (MAC) layer 388, and physical (PHY) layer 390. In one implementation, protocol stack 300 may be a protocol stack of a remote UE (e.g., remote UE 206 in FIG. 2) or a relay UE (e.g., relay UE 204 in FIG. 2).

As shown in FIG. 3, RRC layer 382 may include network functions, such as path selection. PDCP layer 384 may include network functions, such as in-sequence delivering, header compression, QoS Mapping, and security. RLC layer 386 may include network functions, such as acknowledgement/non-acknowledgement (ACK/NACK), and segmentation/concatenation. MAC layer 388 may include network functions, such as hybrid automatic repeat request (HARQ), multiplexing/de-multiplexing, and scheduling (ProSe Per-Packet Priority (PPPP)/Relay Group Priority). PHY layer 390 may include network functions, such as error correction, channel coding, power class indication, and modulation/demodulation.

When a relay network slice instance is created, CN 208 or base station 202, depending on relay service type, may indicate which network functions need be generated in relay UE 204 and remote UE 206 to fulfill the relay service. For example, the relay network slice instance may have the header compression function and security function in PDCP layer 384. The relay network slice instance may have the power class indication function to adjust the radiation power of relay UE 204 and remote UE 206 dynamically. In one implementation, a relay network slice instance may be created from a Network Slice Template (NST), which may include relay service related Network Function(s) and corresponding resource requirements necessary to provide the required telecommunication services and network capabilities.

The relay network slice instance may have the path selection function in RRC layer 382 to select a path between remote UE 206 and base station 202 to exchange data, for example. In some implantations, when the relay network slice instance is Layer-2 relaying, base station 202 may decide whether remote UE 206 is to connect with base station 202 directly for data exchange. In some implantations, when the relay network slice instance is Layer-2 relaying, base station 202 may decide whether remote UE 206 is to connect with base station 202 through the assistance of relay UE 204 for data exchange. Thus, base station 202 may deliver a downlink (DL) control signaling dynamically (e.g., RRCConnectionReconfiguration message) to indicate a path (e.g., a direct path or a relay path) for remote UE 206. Thus, base station 202 can dynamically configure the RAN structure for optimizing the relay service. In some implantations, the path selection mechanism may be implemented by remote UE 206. As such, the Relay network slice configuration message may require remote UE 206 to configure the path selection mechanism in the relay network slice instance.

In some implementations, when the relay network slice instance is Layer-3 relaying, the ProSe Function in CN 208 may decide the path selection for remote UE 206. Based on the Relay network slice configuration message, relay UE 204 and remote UE 206 may provide other necessary network functions (as shown in FIG. 3) for the relay network slice instance.

Figure 4A:
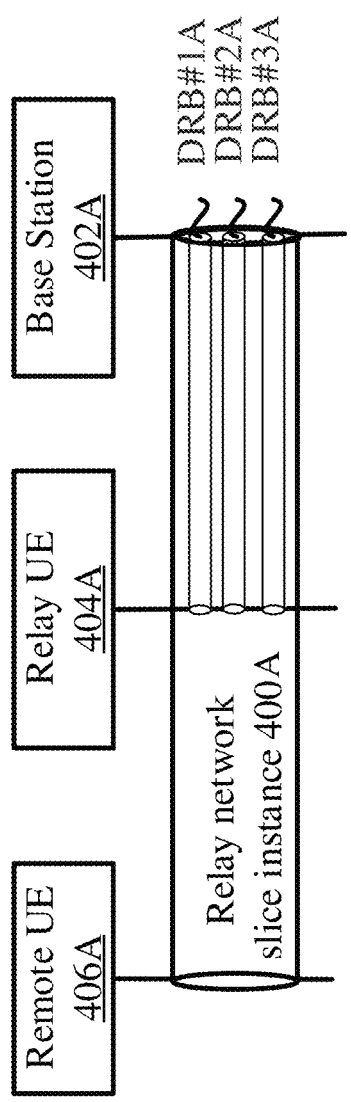
FIG. 4A is a diagram illustrating a configuration of Uu DRBs for a relay service in a relay network slice instance, in accordance with an exemplary implementation of the present application.

In addition to relay service type and network function configuration for a relay network slice instance, each of the Relay network slice configuration messages may also include an end-to-end QoS control configuration. The Relaying network slice configuration message may provide the QoS control configurations and control mechanisms to guarantee the end-to-end QoS of each relay service. FIG. 4A is a diagram illustrating a configuration of DRBs for a relay service in a relay network slice instance (relay network slice instance 400A), in accordance with an exemplary implementation of the present application. In the present implementation, base station 402A, relay UE 404A, remote UE 406A may substantially correspond to base station 202, relay UE 204, any one of remote UE 206, respectively, in FIG. 2. The Relay network slice configuration message may configure the construction of Uu data radio bearers (DRBs) in the network slice instance for end-to-end QoS. In relay network slice instance 400A, the termination points of DRBs are at the relay UE 404A and base station 402A.

Figure 4B:
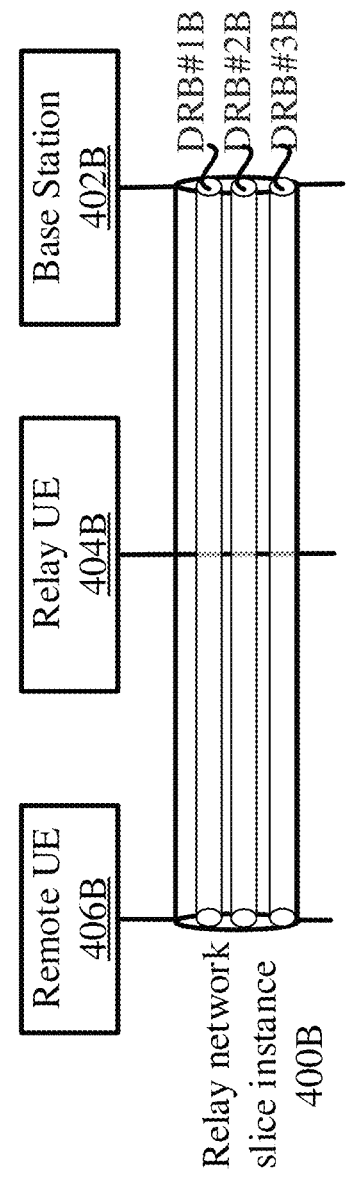
FIG. 4B is a diagram illustrating a configuration of DRBs for a relay service in a relay network slice instance, in accordance with an exemplary implementation of the present application.

FIG. 4B is a diagram illustrating a configuration of DRBs for a relay service in a relay network slice instance (relay network slice instance 400B), in accordance with an exemplary implementation of the present application. In FIG. 4B, base station 402B, relay UE 404B, remote UE 406B may substantially correspond to base station 202, relay UE 204, any one of remote UE 206, respectively, in FIG. 2. In relay network slice instance 400B, Relay network slice configuration message may also configure the construction of data radio bearers (DRBs) in the network slice instance for end-to-end QoS. As shown in FIG. 4B, the termination points of the DRBs in one network slice instance are at remote UE406B and base station 402B.

Also in the Relay network slice configuration message, the relay network slice instance may also provide a QoS mapping function. The QoS mapping function configures the mapping rules between (Uu) DRB and QoS profile in sidelink between relay UE 404A and remote UE 406A in the relay network slice instance 400A. In some embodiments, the QoS mapping function configures the mapping rules between DRB and QoS profile in sidelink between base station 402B and remote UE 406B. In some embodiments, the QoS mapping function may be configured as one function in PDCP sub-layer, as shown in FIG. 3. In some embodiments, the QoS mapping function is configured in a sub-layer between the PDCP and RLC sub-layer (e.g. an adaptation layer).

In some embodiments, the QoS profile in sidelink may be realized based on the PPPP approach. In the PPPP approach, each packet has a PPPP value (may be provided by Layer-2, Layer-3, or higher layers). For relay UE 404A and remote UE 406A, a scheduler in MAC layer 388 may firstly schedule the packet(s) with the highest PPPP among all the pending packets in the buffer. Then, other packets belong to the same relay group of the scheduled packet may also be transmitted together until the granted radio resource to the relay group is exhausted. In these embodiments, the Relay network slice configuration message may configure the mapping rules between the DRBs and the PPPPs. As shown in FIG. 4A, for a relay network slice instance, base station 402A may indicate at least one DRB for the relay network slice. In some embodiments, multiple DRBs (e.g., DRB#1A DRB#2A, and DRB#3A) are allocated to packets with different PPPPs in the relay network slice instance. In the present implementation, the Relay network slice configuration message may provide mapping rules between the packets with different PPPP values and the indicated DRBs. One embodiment of the mapping rules for relay network slice instance 400A is provided in Table 1. Firstly, the range of PPPP may be 8 possible continuous integers (e.g., 1 (highest priority)~8 (lowest priority)). In relay network slice instance 400A, packets of PPPP values {1, 3, 4, 5, 6} may be exchanged for the relay service, and DRB#1A-#3A are generated between relay UE 404A and base station 402A. So, in Table 1, it shows that packets with PPPP value {1} may be mapped to DRB#1A, packets with PPPP values {3} may be mapped to DRB#2A, and packets with PPPP values {4, 5, 6} may be mapped to DRB#3A. So, relay UE 404A and base station 402A may dispatch the packets with different PPPP values to different DRBs based on the given mapping rules. The same mapping methodology may be applicable to the relay network slice instance 400B, which packets of PPPP values {1, 3, 4, 5, 6} may be exchanged for the relay service, and DRB#1B~#3B are generated between base station 402B and remote UE 406B. The mapping rules, as shown in Table 2, may be provided to remote UE 406B and base station 402B during the configuration of relay network slice instance 400B. So, base station 402B and remote UE 406B may dispatch the packets with different PPPP values to different DRBs based on Table 2.

TABLE 1

Mapping rules between the PPPP values
and indicated DRB#1A~DRB#3A
in the relay network slice instance 400A

| Data Radio Bearer | ProSe Per-Packet Priority |
| --- | --- |
| DRB#1A | 1, |
| DRB#2A | 3 |
| DRB#3A | 4, 5, 6 |

TABLE 2

Mapping rules between the PPPP values
and indicated DRB#1B~DRB#3B
in the relay network slice instance 400B

| Data Radio Bearer | ProSe Per-Packet Priority |
| --- | --- |
| DRB#1B | 1, |
| DRB#2B | 3 |
| DRB#3B | 4 ,5, 6 |

Relay UE 404A may be configured to serve more than one relay network slice instance. Thus, in the present implementation, base station 402A may configure a relay network slice instance to relay UE 404A by jointly considering the capacity of relay UE 404A and the existing relay network slice that relay UE 404A is serving. In the present implementation, base station 402A may require relay UE 404A to report its capacity before sending the Relay network slice configuration message to relay UE 404A.

In addition, in MAC layer 388 of protocol stack 300, the relay network slice instance may configure the scheduling policy based on either the PPPP approach or the relay group priority approach. In the relay group priority approach, each relay group may be assigned with a group priority (may be provided by the Relay network slice configuration message). A scheduler may schedule all the packets of the highest relay group priority first. Then, the scheduler may schedule the packets of the second highest relay group priority, and so on. In the relay group priority approach, it is also possible that the packets belonging to the same relay group may be scheduled based on their PPPP (if PPPP is given) until the granted radio resource for the relay group is exhausted.

Referring back to FIG. 2, blocks 270 through 278 show as sidelink radio access mechanism, in accordance with an exemplary implementation of the present application. After the provision of relay network slice instance, base station 202 may start to configure sidelink radio resource for the relay service based on, for example, the QoS requirement of the relay network slice instance.

In block 270, base station 202 may provide the corresponding SL-measurement configuration messages to relay UE 204 and remote UE 206. Each of the SL-measurement configuration messages may include an SL-candidate component carrier (CC) list for the corresponding UE (e.g., relay UE 204 or remote UE 206). Each of the SL-measurement configuration messages may also include thresholds for the corresponding UE (e.g., relay UE 204 or remote UE 206) to select qualified CCs for an SL-measurement report.

In the present implementation, base station 202 may provide an SL-candidate CC list to relay UE 204, and an SL-candidate CC list to remote UE 206. Each of the SL-candidate CC lists may cover CCs in licensed bands (licensed CCs) and CCs in unlicensed (unlicensed CCs). In the present implementation, base station 202 may also provide thresholds for relay UE 204 and remote UE 206 to select qualified CC(s) for their corresponding SL-measurement reports. It should be understood that the values of the thresholds may vary with the QoS requirements of the relay network slice instance. After receiving the SL-measurement configurations from base station 202, each of relay UE 204 and remote UE 206 may take their SL-candidate CC measurements.

An exemplary SL-measurement configuration of licensed CCs is shown in Table 3.

TABLE 3

SL-measurement Configuration for (licensed CCs.
SL-measurement configuration (licensed CC)

| | | |
|---|---|---|
| SL-Candidate Licensed Band CC list | Frequency ID of Candidate CC Target cell ID Frequency ID of Candidate CC Target cell ID | $Freq\_ID\_CC_{L1}$ $CC_{t\_1}$ $Freq\_ID\_CC_{L2}$ $CC_{t\_2}$ |
| SLSS ID (optional) Threshold for CC reselection | | $ID_{SLSS}$ T_S-RSRP-min T_S-RSRQ-min |

In Table 3, an SL-Candidate Licensed Band CC list is provided to indicate the identifiers (IDs) of licensed CCs (e.g., absolute radio-frequency channel number (ARFCN)) that relay UE 204 and/or remote UE 206 may consider and measure. To each licensed CC in the SL-Candidate Licensed Band CC list, base station 202 may provide the Freq_ID_ $CC_{L1}$ to indicate the physical frequency band of the licensed CC. Relay UE 204 and/or remote UE 206 may adjust their RF modules to tune to the target frequency bands for measurement. In addition, base station 202 may also provide target cell ID (e.g., $CC_{t\_1}$) that relay UE 204 and/or remote UE 206 can detect on the licensed CC. In addition, a sidelink synchronization signal (SLSS) ID ($ID_{SLSS}$) may be optionally attached in the SL-measurement configuration message. The SLSS ID can be mapped to a specific SLSS such that relay UE 204 and/or remote UE 206 may identify the target SLSS based on the given $ID_{SLSS}$. In one implementation, remote UE 206 may also discover and measure the relay UE 204 by monitoring the target SLSS based on the given $ID_{SLSS}$. Otherwise, remote UE 206 may recognize relay UE 204 by decoding a relay discovery message delivered by relay UE 204.

The details of the SLSS and relay discovery message will be discussed below:

First, relay UE 204 and/or remote UE 206 may attempt to discover a target cell by monitoring Primary Synchronization Signal (PSS) or Secondary Synchronization Signal (SSS) on the licensed CC in Table 3. In one implementation, cells may broadcast PSS, SSS, or RS (Reference Signal) based on technical specifications of the network system (e.g., a UE system). Relay UE 204/remote UE 206 may proceed to the following actions upon successfully discovering the target cell (e.g., base station 202) and decode the system information provided by the target cell.

Second, relay UE 204 and/or remote UE 206 may receive the broadcasting signal(s), which contains the physical resource configuration and control parameter about the sidelink (e.g., SIB18/SIB19) from the target cell. Relay UE 204 and/or remote UE 206 may then know the configurations and parameters for transmitting/receiving sidelink control signaling on the licensed CC.

Figure 5:
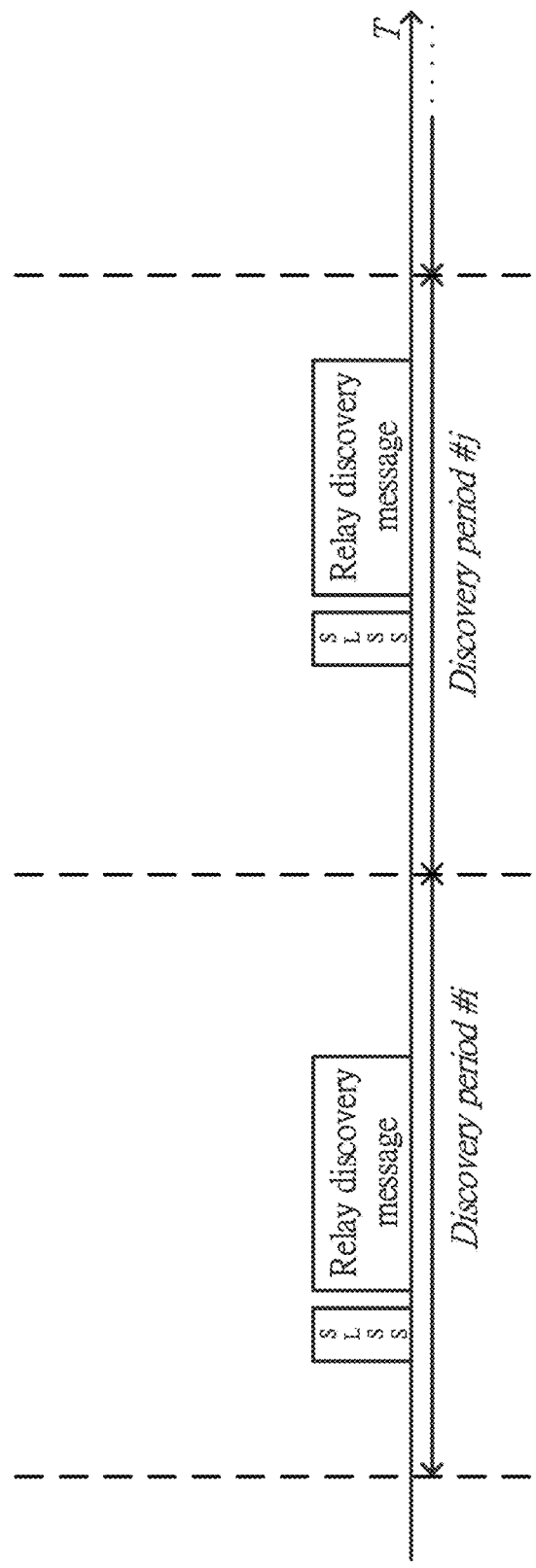
FIG. 5 is a diagram illustrating SLSS and relay discovery message broadcasted by a relay UE, in accordance with an exemplary implementation of the present application.

Third, relay UE 204 may broadcast sidelink control signals based on the received system information from the target cell. As shown in FIG. 5, relay UE 204 broadcasts at least one SLSS and one relay discovery message in each discovery period. The radio resource configuration and control parameters of the discovery period are provided in the broadcasted sidelink control signals. Thus, relay UE 204 may select (e.g., random selection) physical resource blocks (PRBs) in each discovery period based on the system information from the target cell. The SLSS may be indicated by the $ID_{SLSS}$ if the SLSS is provided in the SL-measurement configuration message. The relay discovery message includes ProSe UE ID of relay UE 204, for example.

Fourth, based on the received broadcast signal (e.g., SIB18/SIB19) coming from the target cell, remote UE 206 may also know how to detect the SLSS and relay discovery message delivered by relay UE 204. For example, remote UE 206 can identify relay UE 204 (i.e., target relay UE) by obtaining the ProSe UE ID of relay UE 204 in the relay discovery message. Then, remote UE 206 may measure Sidelink-Reference Signal Received Power (S-RSRP), Sidelink-Received Signal Strength Indicator (S-RSSI), and Sidelink-Reference Signal Received Quality (S-RSRQ) by detecting a Demodulation Reference Signal (DMRS), which is a reference signal multiplexed in the relay discovery message. In addition, remote UE 206 may also measure SLSS if the $ID_{SLSS}$ is provided in the SL-measurement configuration. In one implementation, the physical resource configuration and control parameters about the sidelink may come from base station 202 (i.e., the serving base station). Base station 202 may provide the physical resource configuration and control parameters about the sidelink by broadcasting system information (e.g., SIB 18/SIB 19) or dedicated signaling (e.g., RRCConnectionReconfiguration message) to relay UE 204 and/or remote UE 206 respectively. In one implementation, relay UE 204 and remote UE 206 may skip the first two steps above, where relay UE 204 and remote LIE 206 may realize the transmission/reception of sidelink control signaling based on the timing and configuration from base station 202 in the third step above.

An exemplary SL-measurement configuration of unlicensed CCs is shown in Table 4.

TABLE 4

SL-measurement Configuration for Unlicensed CCs.
SL-measurement configuration (Unlicensed CC)

| | | |
|---|---|---|
| SL-Candidate Unlicensed Band CC list | Frequency ID Candidate CC | $Freq\_ID\_CC_{UL3}(CC_{UL3})$ $Freq\_ID\_CC_{UL2}(CC_{UL2})$ $Freq\_ID\_CC_{UL1}(CC_{UL1})$ $Freq\_ID\_CC_{UL4}(CC_{UL4})$ |
| SLSS ID (optional) Threshold for CC reselection | | $ID_{SLSS}$ T_S-RSRP-min T_S-RSRQ-min T_Choccupancy-max |

In Table 4, an SL-Candidate Unlicensed Band CC list is provided to indicate the identifiers of unlicensed CCs (e.g., absolute radio-frequency channel number (ARFCN)) and their frequency bands that relay UE 204 and/or remote UE 206 may consider and measure. Relay UE 204 and/or remote UE 206 may adjust their RF modules to tune to the target frequency bands for measurement. In some embodiments, SLSS ID $ID_{SLSS}$ may also be optionally attached in the SL-measurement configuration.

Figure 6:
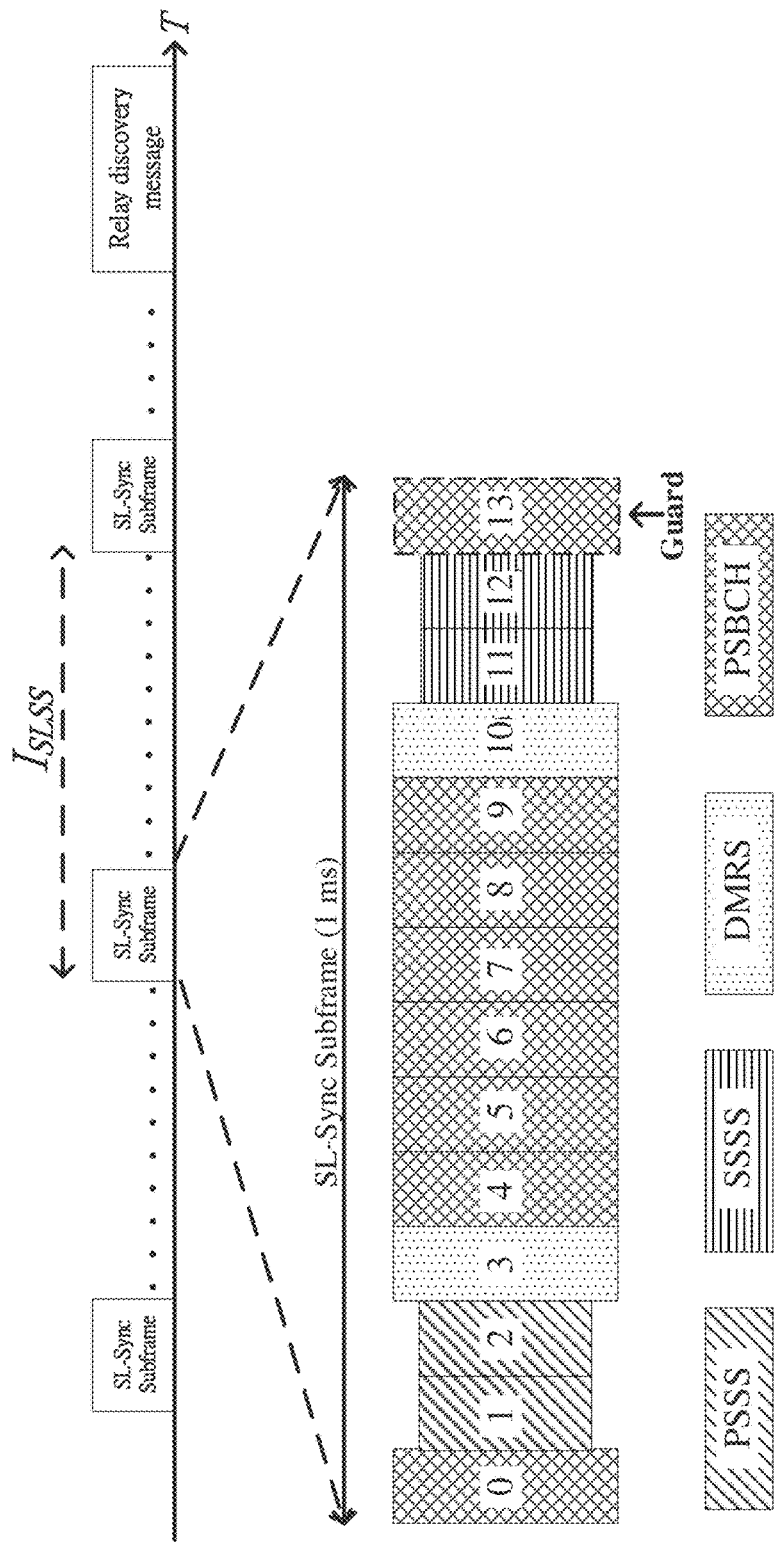
FIG. 6 is a diagram illustrating a relay UE broadcasting an SL-svnc subframe and relay discovery message periodically on an unlicensed CC, in accordance with an implementation of the present application.

In one implementation, relay UE 204 and/or remote UE 206 may transmit/receive sidelink control signaling on an unlicensed CC based on pre-configured parameters respectively stored in relay UE 204 and/or remote UE 206. FIG. 6 is a diagram illustrating a relay UE broadcasting an SL-sync subframe and relay discovery message periodically/aperiodically on an unlicensed CC, in accordance with an implementation of the present application. As shown in FIG. 6, a relay UE (e.g., relay UE 204) may broadcast an SL-sync subframe periodically/aperiodically. The SL-sync subframe includes SLSS, DMRS and PSBCH (Physical Sidelink Broadcast Channel). In addition, the relay UE may also broadcast a relay discovery message periodically/aperiodically. The transmission of the SL-sync subframe and relay discovery message is based on pre-configured control parameters (e.g., SL-Preconfiguration stored in the relay UE). A remote UE (e.g., remote UE 206) may receive the SL-sync subframe to obtain the timing information in the PSBCH. Then, the remote UE may obtain the relay discovery message based on pre-configured control parameters (e.g., SL-P reconfiguration stored in the remote UE) and the timing information obtained from the PSBCH. The remote UE may measure the S-RSRP, S-RSSI, S-RSRQ by detecting the DMRS which is multiplexed in the relay discovery message. In addition, the remote UE may also measure the DMRS and/or SLSS in the SL-sync subframe if the SLSS ID contained in the SL-sync subframe is the same as the SLSS ID provided in the SL-measurement configuration message.

In another implementation, relay UE 204 and/or remote UE 206 may transmit/receive sidelink control signaling on an unlicensed CC based on the configurations provided by base station 202. Base station 202 may provide the configurations to relay UE 204 and/or remote UE 206 in the SL-measurement configuration messages through broadcasting signaling (e.g., SIB18/SIB19) or dedicated signaling to relay UE 204 and/or remote UE 206 respectively (e.g., RRCConnectionReconfiguration message). Thus, relay UE 204 and/or remote UE 206 may know how to transmit/receive their respective SL-sync subframes and relay discovery messages. Remote UE 206 may measure the S-RSRP, S-RSSI, S-RSRQ by detecting the DMRS which is multiplexed in the relay discovery message. In one embodiment, relay UE 204 may only broadcast SLSS (and DMRS) in the SL-sync subframe. As such, remote UE 206 may receive the relay discovery message based on the timing information and configuration from base station 202. In SL-candidate CC measurement, remote UE 206 may also measure the DMRS and/or SLSS in the SL-sync subframe if the SLSS ID contained in the SL-sync subframe is the same as the SLSS ID provided in the SL-measurement configuration. In addition to S-RSRP/S-RSRQ, remote UE 206 may also estimate the occupancy ratio of unlicensed CCs. The occupancy ratio is defined by the following equation:

$$\text{Occupancy Ratio} = \frac{\text{Number of decoded fail } SLSS}{\text{Number of monitoring attempts}} \quad \text{(Eq. 1)}$$

It should be noted that only the monitoring results which received signal strength (S-RSSI) is greater than $R_{Min}$ are considered in Equation 1, where $R_{Min}$ is a threshold pre-configured (e.g., pre-installed in hardware or configured by base station 202) for the receiver to identify whether the unlicensed CC is occupied or not. The configuration of $R_{Min}$ may depend on the QoS requirement of the relay network slice instance. Different relay network slice instances may have different values for $R_{Min}$.

In a case where, relay UE 204 and/or remote UE 206 transmitting/receiving sidelink control signaling on an unlicensed CC, relay UE 204 and/or remote UE 206 may need to implement Listen-before-talk (LBT) protocol for SLSS transmission. For example, the transmitter would not broadcast the SLSS when it detects that the unlicensed CC is occupied by another device. Even so, the transmitter/receiver can still estimate the S-RSRP, S-RSRQ, and occupancy of the unlicensed CC.

Referring back to FIG. 2, in block 274, after SL-candidate CC measurement, relay UE 204 and remote UE 206 may each provide an SL-measurement report to base station 202 respectively. In one implementation, instead of reporting all the respective SL-measurements to base station 202, relay UE 204 and remote UE 206 may each report the CCs which are qualified for the sidelink CC selection in the SL-measurement report. As mentioned above, the thresholds in SL-measurement configuration are provided for the UEs (e.g., relay UE 204 and remote UE 206) to select qualified CCs. For licensed CCs, base station 202 may provide {T_S-RSRP-min, T_S-RSRQ-min} in SL-measurement configuration. Thus, relay UE 204 and remote UE 206 may only report the licensed CC(s) with S-RSRP being higher than T_S-RSRP-min and S-RSRQ being higher than T_S-RSRQ-min based on the measurements of relay UE 204 and remote UE 206. For unlicensed CCs, base station 202 may provide {T_S-RSRP-min, T_S-RSRQ-min, T_Choccupancy-max} in SL-measurement configuration. Moreover, the values of the thresholds may vary in response to the QoS requirements of the relay network slice instance. In one exemplary implementation, remote UE 206 may only report the unlicensed CC(s) with S-RSRP being higher than T_S-RSRP-min, S-RSRQ being higher than T_S-RSRQ-min and the channel occupancy ratio being lower than the T_Choccupancy-max. In one exemplary implementation, remote UE 206 may provide multiple CCs in its SL-measurement reports and the order of CCs in the SL-measurement reports. The order of CCs, arranging in response to occupancy ratio of the unlicensed CCs, indicates the priority of the unlicensed CCs for sidelink operation.

Referring back to FIG. 2, in block 276, after receiving the SL-measurement reports from relay UE 204 and remote UE 206, base station 202 may provide SL-radio resource configuration messages to indicate which CCs relay UE 204 and remote UE 206 may respectively select for sidelink.

There following are a number of approaches for base station 202 to provide the SL-radio resource configuration message.

According to one approach, to a licensed CC, base station 202 may provide: (1) Index of destination ID; (2) Physical frequency band of the target licensed CC; (3) Dedicated radio resource. The index of destination ID is mapped to a destination ID on the destination ID list, which is configured by the network (e.g., base station 202 or CN 208). In the present implementation, the UE (e.g., relay UE 204 or remote UE 206) may deliver data by using the dedicated radio resource on the target CC based on the timing of base station 202. In some implementations, the dedicated resource may be allocated only for one-time data transmission. In some implementations, base station 202 may configure semi-persist-scheduled dedicated resource in time domain and so that relay UE 204 and remote UE 206 can apply the dedicated resource continuously.

According to another approach, to a licensed CC, base station 202 may provide: (1) Index of destination ID; (2) Physical frequency band of the target licensed CC; (3) Resource pool, which is a group of Physical Resource Blocks (PRBs) cross time domain and frequency domain. The index of destination ID is mapped to a destination ID on the destination ID list, which is configured by the network base station 202 or CN 208). The UE (e.g., relay UE 204 or remote UE 206) may deliver data by selecting PRBs randomly on the given resource pool on the target CC based on the timing of base station 202. In some embodiments, the configured resource pool may be allocated only for one-time data transmission. In some other embodiments, base station 202 may configure relay UE 204 and remote UE 206 to apply the resource pool semi-persist-scheduled in time domain.

Referring back to FIG. 2, in block 278, base station 202 may provide an SL-RAN profile configuration to each of relay UE 204 and remote UE 206 with allocated resource (e.g., dedicated resource or resource pool). The SL-RAN profile configuration includes PHY parameters and settings (e.g., frame structure, modulation, multiplexing, cyclic prefix length, transmission time interval, sub-carrier spacing, and etc.) for sidelink. As such, relay UE 204 and remote UE 206 may encode and/or decode the packet(s) on the allocated sidelink resource based on the given SL-RAN profile configuration.

In the above approaches, the UE (e.g., relay UE 204 or remote UE 206) may synchronize with a target cell on the target CC. The base station (base station 202) may also include the target cell ID with the SL-radio resource configuration message. Thus, the UE (e.g., relay UE 204 or remote UE 206) may synchronize with the target cell and then access the given dedicated resource or resource pool.

According to yet another approach, to an unlicensed CC, base station 202 may provide: (1) Index of destination ID; (2) ID of the unlicensed CC. The index of destination ID is mapped to a destination ID on the destination ID list, which is configured by the network (e.g., base station 202 or CN 208). In the present approach, the UE (e.g., relay UE 204 or remote UE 206) may deliver data by using the unlicensed CC. To access the unlicensed CC, relay UE 204 may become a sidelink synchronization source, which broadcasts the SL-sync subframe periodically. The configuration of SL-sync subframe may be based on pre-configured parameters (e.g., SL-Preconfiguration stored in relay UE 204) or based on the configuration from base station 202 (e.g., SL-radio resource configuration message or SIB 18/SIB 19). So, relay UE 204 or remote UE 206 may synchronize with each other and then exchange data on the unlicensed CC. It is noted that different countries may have different accessing rules, such as listen-before-talk (LBT) protocol or maximum channel occupancy time, for devices to access the unlicensed CC. So, relay UE 204 and remote UE 206 may need to follow the accessing rules.

According to yet another approach, to unlicensed CC(s), base station 202 may provide: (1) Index of destination ID; (2) A candidate CC list which includes ID(s) of unlicensed CC(s); (3) Thresholds for relay UE/remote UE to reselect sidelink CC for data exchange through sidelink. The index of destination ID is mapped to a destination ID on the destination ID list, which is configured by the network (e.g., base station 202 or CN 208). The UE (e.g., relay UE 204 or remote UE 206) may select a sidelink CC dynamically from the given candidate CC list. Relay UE 204 and/or remote UE 206 may select the sidelink CC based on the order of CCs in the candidate CC list in Table 5.

TABLE 5

Candidate CC List and Thresholds for CC Reselection in SL-radio resource configuration Message Provided by Base Station.
Candidate CC List and Thresholds for CC Reselection

| Candidate CC list | $ID\_C_3$ |
| --- | --- |
| | $ID\_C_2$ |
| | $ID\_C_1$ |
| | $ID\_C_4$ |
| Threshold for CC reselection | T_S-RSRQ-min |
| | T_Choccupancy-max |

For example, base station 202 may provide Table 5 to relay UE 204 and/or remote UE 206. Initially, relay UE 204 and/or remote UE 206 may select $ID\_C_3$ as the sidelink CC. However, relay UE 204 and/or remote UE 206 may reselect $ID\_C_2$ as the sidelink CC when relay UE 204 and/or remote UE 206 determine that the quality of $ID\_C_3$ does not fulfill criteria for sidelink CC reselection (e.g., S-RSRQ is lower than T_S-RSRQ-min or the channel occupancy ratio is higher than the T_Choccupancy-max during the operation of sidelink). It is possible that relay UE 204 and/or remote UE 206 may work on $ID\_C_4$ but the reselection event may be triggered. Under such condition, relay UE 204 and/or remote UE 206 may reset the order of sidelink CC selection to $ID\_C_3$ again, or report this condition to base station 202 for the base station 202 to re-allocate a candidate CC list.

It should be noted that, base station 202 may trigger a sidelink radio access mechanism not only after the relay network slice instance is configured, but also may decide whether to trigger sidelink radio access mechanism based on a sidelink buffer status report (e.g., Sidelink BSR) from relay UE 204 or remote UE 206. In a Sidelink BSR, a UE (e.g., relay UE 204 or remote UE 206) may report the packet amount, pending in the buffer, to one destination ID, which has provided in the sidelink UE information. Base station 202 may decide to trigger sidelink radio access mechanism to the UE or the relay group when the pending packets of the UE (e.g., relay UE 204 or remote UE 206) cannot be delivered efficiently (e.g., when the amount of pending packets is higher than a pre-defined threshold).

Moreover, each SL-radio resource configuration message may have a control field to indicate the action of the SL-radio resource configuration message. The control field may include: (1) Add new CC (and radio resource) configuration to the existing sidelink radio resource configuration; (2) Overwrite the existing sidelink radio resource configuration; (3) Modify part of the existing sidelink radio resource configuration, (4) Remove all of the radio resource configuration for sidelink, so that there would be no resource configuration in the SL-radio resource configuration message.

Figure 7:
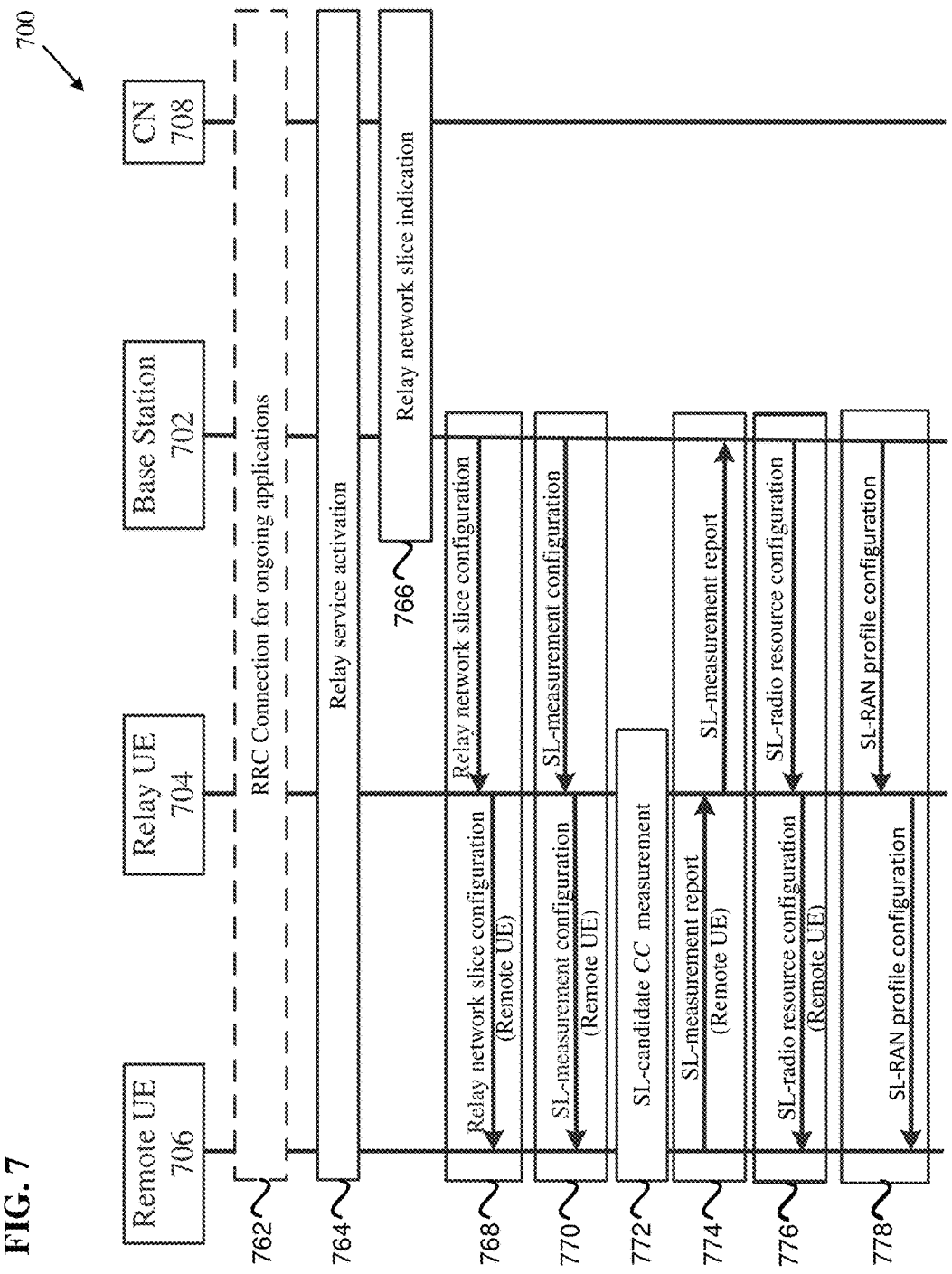
FIG. 7 is a diagram illustrating a method for relaying network slice provisioning and sidelink radio access mechanism, in accordance with an exemplary implementation of the present application.

Referring now to FIG. 7, FIG. 7 is a diagram illustrating a method for relaying network slice instance provisioning and sidelink radio access mechanism, in accordance with an exemplary implementation of the present application. In diagram 700, a wireless communication network includes base station 702, relay UE 704, remote UE 706, and CN 708. In the present implementation, base station 702, relay UE 704, and CN 708 may substantially correspond to base station 202, relay UE 204, and CN 208, respectively, as shown and described with reference to FIG. 2. Different from remote UE 206 (i.e., an in-coverage remote UE) in FIG. 2, remote UE 706 is out of the coverage of base station 702. In the present implementation, relay UE 704 is an in-coverage relay UE, and remote UE 706 is an out-ofcoverage remote UE. That is, relay UE 704 is within the coverage of base station 702, while remote UE 706 is outside the coverage of base station 702. To help remote UE 706 access the network, relay UE 704 may become a sidelink synchronization source, which broadcasts the SL-sync subframe periodically. The configuration of SL-sync subframe may be based on pre-configured parameters (e.g., SL-Preconfiguration stored in relay UE 704) or based on the configuration from base station 202 SL-radio resource configuration message or SIB18/SIB19). So, relay UE 704 or remote UE 706 may synchronize with each other and then exchange data. Then, relay UE 704 may forward the control signaling/data from base station 702 to remote UE 706, and vice versa.

In the present implementation, blocks 762, 764 and 766 may be substantially similarly to blocks 262, 264 and 266 in FIG. 2. Relay UE 704 and remote UE 706 may each have a ProSe UE ID. In the present implementation, relay network slice instance and sidelink radio access mechanism may be achieved through relay UE 704.

In the present implementation, blocks 768, 770, 772, 776 and 778 may be similarly to blocks 268, 270, 272, 276 and 278 in FIG. 2, with differences evident from FIG. 7. As shown in FIG. 7, in blocks 768 and 770, base station 702 may deliver Relay network slice configuration and SL-measurement configuration to relay UE 704, respectively. Different from FIG. 2, the signals delivered to relay UE 704 also include control commands to remote UE 706. Thus, relay UE 704 may forward Relay network slice configuration (Remote UE) and SL-measurement configuration (Remote UE) to Remote UE 706, in blocks 768 and 770, respectively. Relay UE 704 and remote UE 706 may take SL-candidate CC measurements based on their corresponding SL-measurement configurations. After SL-candidate CC measurements in block 772, in block 774, remote UE 706 may deliver its SL-measurement report to relay UE 704. Then, relay UE 704 may deliver its SL-measurement report and the SL-measurement report of remote UE 706 to base station 702. In blocks 776 and 778, base station 702 may deliver SL-radio resource configuration and SL-RAN profile configuration to relay UE 704, respectively. Relay UE 704 may forward the SL-radio resource configuration (Remote UE) and SL-RAN profile configuration to remote UE 706.

It is noted that in some implementations, the method for relaying network slice instance provisioning and sidelink radio access mechanism plotted in FIG. 7 is also applicable to in in-coverage remote UE (e.g., remote UE 206 in FIG. 2), which is under the radio coverage of base station 702.

Figure 8:
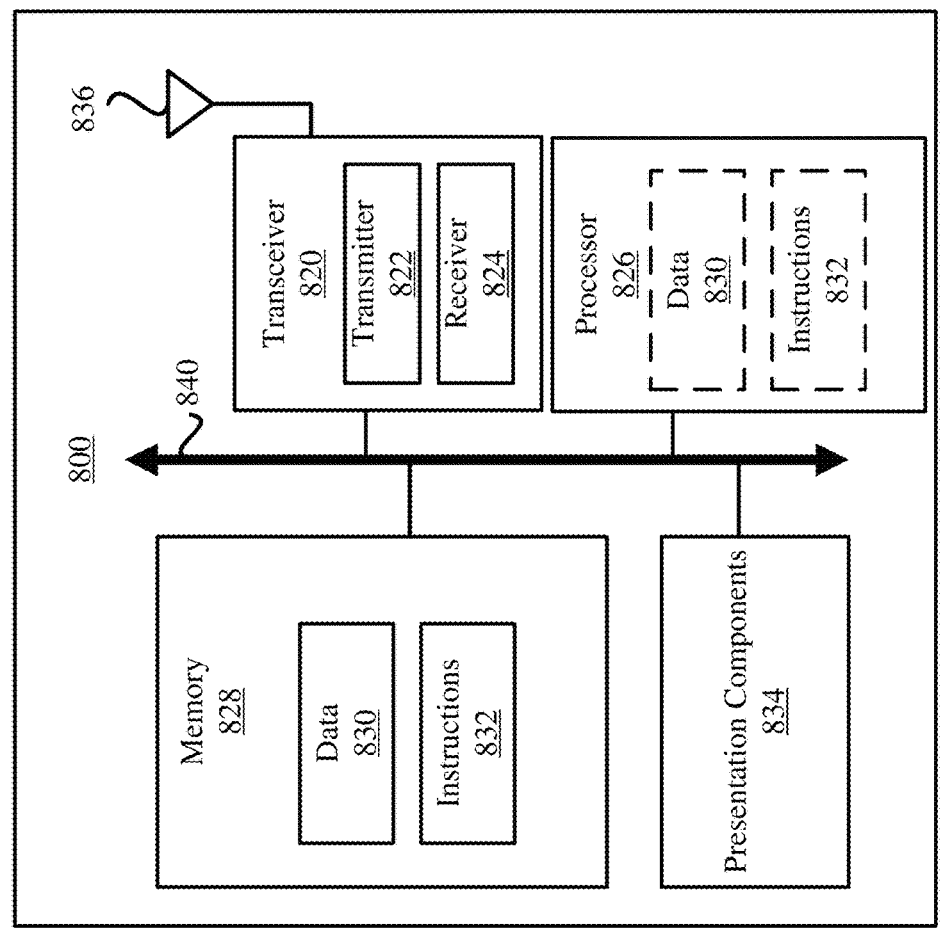
FIG. 8 is a block diagram illustrating a node for wireless communication, in accordance with an exemplary implementation of the present application.

FIG. 8 illustrates a block diagram of node 800 for wireless communication, in accordance with various aspects of the present application. The node 800 may have various configurations and may be included or be part of a base station and/or a UE. In some implementations, node 800 may be an example of one or more aspects of base stations 102, 202, 402A, 402B, and/or 702, described with reference to FIGS. 1, 2, 4A, 4B, and/or 7, respectively. In some implementations, node 800 may be an example of one or more aspects of relay/remote UE 104/106, relay/remote UE 204/206, relay/remote UE 404A/406A, relay/remote UE 404B/406B, and/or relay/remote UE 704/706 described with reference to FIGS. 1, 2, 4A, 4B, and/or 7, respectively. Node 800 may be configured to implement or facilitate at least some of the features and functions described with reference to FIGS. 1, 2, 3, 4A, 4B, 5, 6, and/or 7.

As shown in FIG. 8, node 800 may include transceiver 820, processor 826, memory 828, one or more presentation components 834, and at least one antenna 836. Node 800 may also include an RF spectrum band module, a base station communications module, a network communications module, and a system communications management module, input/output (I/O) ports, I/O components, and power supply (not explicitly shown in FIG. 8). Each of these components may bean communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit. In different types of subframes including, but not limited to, usable, non-usable and flexibly usable subframes. Transceiver 820 may be configured to receive data and control channels.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media., The term "modulated data signal" means a signal that has one or more of its characteristics set or changed. In such a manner as to encode information in the signal. By way of example, and not limitation, communication media includes wired media such as a wired network or direct-wired connection, and wireless media such as acoustic, RE, infrared and other wireless media. Combinations of any of the above should also be included within the scope of computer-readable media.

Memory 828 may include computer-storage media in the form of volatile and/or non-volatile memory, Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1, 2, 3, 4A, 4B, 5, 6, and/or 7. Alternatively, instructions 832 may not be directly executable by processor 826 but be configured to cause node 800 (e.g., when compiled and executed) to perform various functions described herein.

Processor 826 may include an intelligent hardware device, e.g., a central processing unit (CPU), a microcontroller, an ASIC, and etc. Processor 826 may include memory. Processor 826 may process data 830 and instructions 832 received from memory 828 and information through transceiver 820, the base band communications module, and/or the network communications module. Processor 826 may also process information to he sent to transceiver 820 for transmission through antenna 836, to the network communications module for transmission to a core network (e.g., CN 108 in FIG. 1).

One or more presentation components 834 presents data indications to a person or other device. Exemplary one or more presentation components 834 include a display device, speaker, printing component, vibrating component, and etc.

What is claimed is:

1. A method for a relay user equipment (UE) to forward packets between a base station and a remote UE, the method comprising:
    determining a relay service type;
    assigning network functions by the base station to at least one of the remote UE and the relay UE for a relay network slice, wherein the relay network slice and the corresponding network functions are based on the relay service type;
    selecting one or more sidelink (SL)-radio resources to forward the packets for the relay network slice between the remote UE and the relay UE.

2. The method of claim 1, wherein the relay service type is a Layer-2 relaying or a Layer-3 relaying.

3. The method of claim 1, wherein the selecting the one or more SL-radio resources comprises:
    sending an SL-measurement configuration from the base station to at least one of the remote UE and the relay UE.

4. The method of claim 3, wherein the sidelink-measurement configuration includes a list of SL-candidate component (CC) carriers.

5. The method of claim 4, wherein the list of SL-CC carriers includes licensed band component carriers and/or unlicensed band component carriers.

6. The method of claim 3, wherein the SL-measurement configuration includes at least one of a frequency identifier of a candidate component carrier, a target cell ID, a sidelink synchronization signal ID, an occupancy ratio, and a threshold for component carrier selection.

7. The method of claim 1, wherein the selecting the one or more SL-radio resources comprises:
    sending an SL-measurement report from at least one of the remote UE and the relay UE to the base station;
    sending an SL-radio access network (RAN) profile configuration message from the base station to at least one of the remote UE and the relay UE.

8. The method of claim 7, wherein the SL-RAN profile configuration message includes at least one of frame structure, modulation, multiplexing, cyclic prefix length, transmission time interval, and sub-carrier spacing.

9. The method of claim 1, wherein the base station is configured to dynamically configure a radio access network structure for optimizing the relay service.

10. The method of claim 1, wherein the network functions include at least one of path selection, in-sequence delivering, header compression, security, ACK/NACK, segmentation/concatenation, HARQ, QoS mapping, and scheduling based on Proximity-based Service (ProSe) Per-Packet Priority (PPPP) or Relay Group Priority.

11. A base station comprising:
    one or more non-transitory computer-readable media having computer-executable instructions embodied thereon that, when executed, perform a method for a relay user equipment (UE) to forward packets between the base station and a remote UE, the method comprising:
        determining a relay service type;
        assigning network functions by the base station to at least one of the remote UE and the relay UE for a relay network slice, wherein the relay network slice and the corresponding network functions are based on the relay service type;
        selecting one or more sidelink (SL)-radio resources to forward the packets for the relay network slice between the remote UE and the relay UE.

12. The base station of claim 11, wherein the relay service type is a Layer-2 relaying or a Layer-3 relaying.

13. The base station of claim 11, wherein the selecting the one or more SL-radio resources comprises:
    sending an SL-measurement configuration from the base station to at least one of the remote UE and the relay UE.

14. The base station of claim 13, wherein the sidelink-measurement configuration includes a list of SL-candidate component (CC) carriers.

15. The base station of claim 14, wherein the list of SL-CC carriers includes licensed band component carriers and/or unlicensed band component carriers.

16. The base station of claim 13, wherein the SL-measurement configuration includes at least one of a frequency identifier of a candidate component carrier, a target cell ID, a sidelink synchronization signal ID, an occupancy ratio, and a threshold for component carrier selection.

17. The base station of claim 11, wherein the selecting the one or more SL-radio resources comprises:
    receiving an SL-measurement report from at least one of the remote UE and the relay UE;
    sending an SL-radio access network (RAN) profile configuration message from the base station to at least one of the remote UE and the relay UE.

18. The base station of claim 11, wherein the base station is configured to dynamically configure a radio access network structure for optimizing the relay service.

19. The base station of claim 11, wherein the network functions include at least one of path selection, in-sequence delivering, header compression, security, ACK/NACK, segmentation/concatenation, HARQ, QoS mapping, and scheduling based on Proximity-based Service (ProSe) Per-Packet Priority (PPPP) or Relay Group Priority.

20. A user equipment (UE) for wireless communication, the UE comprising:
    one or more non-transitory computer-readable media having computer-executable instructions embodied thereon;
    at least one processor coupled to the one or more non-transitory computer-readable media, and configured to execute the computer-executable instructions to:
        receive network functions assigned by a base station for a relay network slice,
    wherein the relay network slice and the corresponding network functions are based on a relay service type transmitted by the base station;
        receive a sidelink (SL)-measurement configuration from the base station;
        take measurements of SL-candidate component (CC) carriers based on the SL-measurement configuration;
        provide an SL-measurement report to the base station;
        receive an SL-radio resource configuration and a corresponding SL-radio access network (RAN) profile configuration from the base station to forward packets for the relay network slice between the UE and another UE.

21. The UE of claim 20, wherein the at least one processor is coupled to the one or more non-transitory computer-readable media, and configured to execute the computer-executable instructions to:
 encode or decode a packet on an SL-radio resource based on the corresponding SL-RAN profile configuration.

* * * * *